United States Patent
Xi

(10) Patent No.: US 8,198,934 B2
(45) Date of Patent: Jun. 12, 2012

(54) CIRCUIT FOR DETECTING MANAGEMENT ENGINE STATE

(75) Inventor: Chun-Fang Xi, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 249 days.

(21) Appl. No.: 12/730,235

(22) Filed: Mar. 24, 2010

(65) Prior Publication Data

US 2011/0121882 A1 May 26, 2011

(30) Foreign Application Priority Data

Nov. 20, 2009 (CN) .......................... 2009 1 0310159

(51) Int. Cl.
*H03K 17/687* (2006.01)

(52) U.S. Cl. ...................................................... 327/427
(58) Field of Classification Search ................... 327/427
See application file for complete search history.

(56) References Cited

U.S. PATENT DOCUMENTS

| 6,469,573 | B2 * | 10/2002 | Kanda et al. | .................. 327/541 |
| 7,805,623 | B2 * | 9/2010 | Jia et al. | ........................ 713/300 |
| 2011/0227613 | A1 * | 9/2011 | Xi | ................................. 327/143 |

* cited by examiner

*Primary Examiner* — Hai L Nguyen
(74) *Attorney, Agent, or Firm* — Altis Law Group, Inc.

(57) ABSTRACT

A circuit for detecting management engine (ME) state of a computer includes first and second electrical switches, and an indicating circuit. The first and second electrical switches are connected to a south bridge of the computer and respectively receive an ME state signal and a startup signal from the south bridge. The ME state signal and startup signal are operable to turn on or turn off the first and second electrical switches to control the indicating circuit to indicate ME state of the computer.

2 Claims, 1 Drawing Sheet

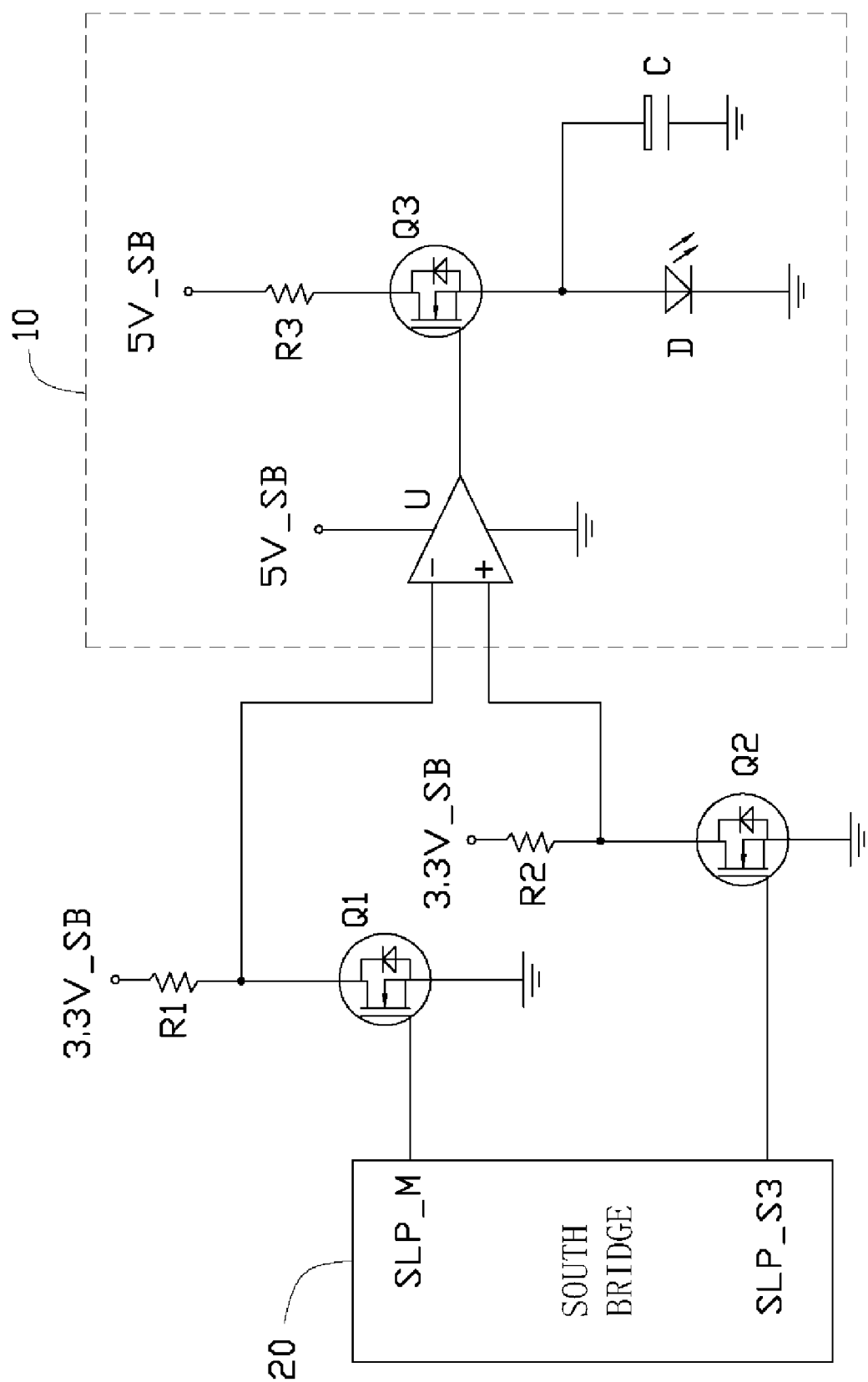

CIRCUIT FOR DETECTING MANAGEMENT ENGINE STATE

BACKGROUND

1. Technical Field

The present disclosure relates to a circuit for detecting management engine (ME) state of a computer.

2. Description of Related Art

ME is a common technology applied in a computer to manage power supply, etc.

When ME of a computer is disabled, i.e., the ME will have no effect on the busses of the computer at startup, which is exactly required when the computer is debugged to avoid signal interference to the busses caused by the ME.

In practice, an operator should enter the ME configuration interface to determine whether the ME is disabled before debugging, which is time-consuming.

BRIEF DESCRIPTION OF THE DRAWING

The drawing is a circuit diagram of an exemplary embodiment of a circuit for detecting management engine (ME) state of a computer.

DETAILED DESCRIPTION

Referring to the drawing, an exemplary embodiment of a circuit for detecting management engine (ME) state of a computer includes two n-channel metal-oxide-semiconductor field-effect transistors (MOSFET) Q1 and Q2 and an indicating circuit 10. The indicating circuit 10 includes a comparator U, an n-channel MOSFET Q3, a light-emitting diode (LED) D, and a capacitor C.

A gate of the MOSFET Q1 is connected to a ME state pin SLP_M of a south bridge 20 of a motherboard of the computer, a drain of the MOSFET Q1 is connected to a first power supply 3.3V_SB via a first resistor R1, a source of the MOSFET Q1 is grounded. A gate of the MOSFET Q2 is connected to a system startup pin SLP_S3 of the south bridge 20 of a computer, a drain of the MOSFET Q2 is connected to the first power supply 3.3V_SB via a second resistor R2, a source of the MOSFET Q2 is grounded. An inverting terminal and a non-inverting terminal of the comparator U are respectively connected to the drains of the MOSFET Q1 and Q2, an output terminal of the comparator U is connected to a gate of the MOSFET Q3. A positive power terminal of the comparator U is connected to a second power supply 5V_SB, a negative power terminal of the comparator U is grounded. A drain of the MOSFET Q3 is connected to the second power supply via a third resistor R3. A source of the MOSFET Q3 is connected to an anode of the LED D and grounded via the capacitor C. A cathode of the LED D is grounded.

In use, if the ME function of a motherboard of a computer is enabled when the computer is starting up, the ME state pin SLP_M outputs an ME state signal at high voltage level, after a period of time T the system startup pin SLP_S3 outputs a startup signal at high voltage level. During time T, the MOSFET Q1 is turned on and the drain of the MOSFET Q1 outputs a low voltage, the MOSFET Q2 is turned off and the drain of the MOSFET Q2 outputs a high voltage, so the non-inverting terminal of the comparator U has a higher voltage than the inverting terminal of the comparator U, the output terminal of the comparator U outputs a high voltage. The MOSFET Q3 is turned on, the LED D is turned on, the capacitor C is charged. After time T has elapsed, the MOSFET Q2 is also turned on and the drain of the MOSFET Q2 outputs a low voltage, so the voltage of the non-inverting and inverting terminals of the comparator U are at the same voltage level. The output terminal of the comparator U outputs a low voltage, the MOSFET Q3 is turned off. The capacitor C begins to discharge through the LED D, the LED D continues emitting light for a period of time. When the computer enters power-saving mode, such as suspends to ram or disk, the ME state pin SLP_M remains at high voltage level, the system startup pin SLP_S3 outputs a low voltage, the LED D is turned on again.

If the ME state of the computer is disabled when the computer is starting up, the ME state pin SLP_M and the system startup pin SLP_S3 output high voltages at the same time, the MOSFET Q1 and Q2 are turned on simultaneously, the inverting terminal and the non-inverting terminal of the comparator U are at the same voltage level, the output terminal of the comparator U outputs a low voltage, the MOSFET Q3 is turned off, the LED D is turned off. When the computer enters power-saving mode, the ME state pin SLP_M and the system startup pin SLP_S3 output low voltages at the same time, the MOSFET Q1 and Q2 are turned off simultaneously, the inverting terminal and the non-inverting terminal of the comparator U are still at the same voltage level, the output terminal of the comparator U outputs a low voltage, the MOSFET Q3 remains turned off, the LED D remains off.

In other embodiments, the MOSFETs Q1-Q3 may be replaced of other types of electrical switches, such as npn transistors.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A circuit for detecting management engine (ME) state of a computer, the circuit comprising:

a first electrical switch comprising first to third terminals, wherein the first terminal is connected to a south bridge of the computer to receive an ME state signal, the second terminal is connected to a first power supply via a first resistor, the third terminal is grounded;

a second electrical switch comprising first to third terminals, wherein the first terminal is connected to the south bridge to receive a startup signal, the second terminal is connected to the first power supply via a second resistor, the third terminal is grounded; and an indicating circuit comprising first and second input terminals, wherein the first input terminal is connected to the second terminal of the first electrical switch, the second input terminal is connected to the second terminal of the second electrical switch;

wherein the indicating circuit comprises a comparator, a third electrical switch, a light-emitting diode (LED), and a capacitor; an inverting and a non-inverting terminals of the comparator respectively function as the first and second input terminals of the indicating circuit, an output terminal of the comparator is connected to a first terminal of the third electrical switch, a second terminal of the third electrical switch is connected to a second power supply via a third resistor, a third terminal of the third electrical switch is connected to an anode of the LED and grounded via the capacitor, a cathode of the LED is grounded; and wherein the first and second electrical switches are operable to control the indicating circuit to indicate ME state of the computer according to the voltages of the ME state signal and the startup signal.

2. The circuit of claim 1, wherein the first to third electrical switches are n-channel metal-oxide-semiconductor field-effect transistors, the first to third terminals of each of the first to third electrical switches respectively correspond to a gate, a drain, and a source.

* * * * *